United States Patent [19]

Yata et al.

[11] 3,893,140
[45] July 1, 1975

[54] AUTOMATIC EXPOSURE TIME CONTROL APPARATUS FOR CAMERA

[75] Inventors: Kintaro Yata, Ikeda; Yoshio Kuramoto, Sakai, both of Japan

[73] Assignee: Minolta Camera Kabushiki Kaisha, Osaka, Japan

[22] Filed: Mar. 1, 1972

[21] Appl. No.: 231,041

Related U.S. Application Data

[63] Continuation of Ser. No. 12,562, Feb. 10, 1970, abandoned.

[52] U.S. Cl. .................. 354/50; 354/51; 354/60 R
[51] Int. Cl.² ................................... G03B 7/08
[58] Field of Search .......... 95/10 CT, 10 C; 354/50, 354/51, 60 R

[56] References Cited
UNITED STATES PATENTS

| | | | |
|---|---|---|---|
| 3,388,648 | 6/1968 | Thiele et al. | 95/10 |
| 3,476,028 | 11/1969 | Namba et al. | 95/10 X |
| 3,476,030 | 11/1969 | Rentschler et al. | 95/10 X |
| 3,503,313 | 3/1970 | Kuramoto | 95/10 |

Primary Examiner—Samuel S. Matthews
Assistant Examiner—Russell E. Adams, Jr.
Attorney, Agent, or Firm—Wolder & Gross

[57] ABSTRACT

A group of terminals for manual exposure setting to be selected by a manual selector are respectively connected to a resistor by lead wires which are spaced apart over the length thereof and through which resistance values corresponding to respective exposure times are obtained stepwise. By means of conductors, the group of the terminals are each connected to another group of terminals to be selected automatically at the position which corresponds to the intensity of incident light from the subject. The operation to close the shutter is controlled by an electromagnet which is operated by an RC integrating circuit actuated with the resistance value of the resistor determined alternatively by one of the two terminal groups and a transistor circuit connected to the integrating circuit. The groups of the terminals, the resistor and conductors connecting these elements are assembled into a single set.

7 Claims, 7 Drawing Figures

Inventor
KINTARO YATA
YOSHIO KURAMOTO
By Stanley Wolder
Attorney

PATENTED JUL 1 1975　　3,893,140
SHEET 4

Inventor
KINTARO YATA
YOSHIO KURAMOTO
By Stanley Wolder
Attorney

AUTOMATIC EXPOSURE TIME CONTROL APPARATUS FOR CAMERA

This is a continuation of application Ser. No. 12,562 filed Feb. 10, 1970, now abandoned.

BACKGROUND OF THE INVENTION

The present invention relates to an automatic exposure time controlling device for a camera, more particularly to a device for electrically controlling the exposure time for a camera, the circuit of the device further being adjustable for manual exposure time control.

It has already been known to employ an RC integrating circuit in the electric circuit for controlling exposure time for the electronic shutter. In controlling exposure time automatically, photoconductive cells such as CdS are most extensively used as the resistance of the RC integrating circuit. On the other hand, employed as the resistance for manual exposure control in many of conventional devices are a desired number of fixed resistances each of which is different in resistance value. An example of such device is shown in FIG. 1.

Referring to FIg. 1, designated at $Eo$ is a power source; at PR, a photoconductive cell; at C, capacitor; at $Rt_1$, $Rt_2$ ... $Rt_n$, fixed resistances for manual exposure time control; at $Tr_1$, $Tr_2$, $Tr_3$, transistors; at $M_1$, an electromagnet to act on the shutter mechanism in controlling the exposure time; and at $Sw_1$, $Sw_2$, $Sw_3$, switches. In the case where the selector switch $Sw_3$ is connected to a terminal $a$ in this circuit, an integrating circuit is formed, with its time constant determined by the photoconductive cell PR and capacitor C, and the exposure time can be controlled automatically in accordance with the intensity of incident light from the subject. Further when the switch $Sw_3$ is connected to one of the terminals $bt_1$, $bt_2$ ... $bt_n$, manual exposure time control is achieved in accordance with the time constant which is determined by the capacitor C and the resistance selected from among the fixed resistances $Rt_1$, $Rt_2$ ... $Rt_n$.

However, the electronic shutter of this type is subject to the following relation:

$$Rc = RoI^{-\gamma}, \qquad (1)$$

wherein $I$ is illuminance on the photoconductive cell corresponding to scene brightness of the subject, $Rc$ is a resistance value of the cell at this time, is a coefficient of illuminance-resistance characteristics of the cell and $Ro$ is a constant. On the other hand, the exposure time $T$ is represented by:

$$T = a\,RcC, \qquad (2)$$

wherein $a$ and $C$ are constants. Hence, from Equations (1) and (2), $$T = a\,C\,RoI^{-\gamma}.$$

Accordingly, the exposure time is subject to the influence of the coefficient $\gamma$ of illuminance-resistance characteristics of the photoconductive cell. (Provided that $\gamma = 1$, $T \propto 1/I$, this showing that the exposure time is in inverse proportion to the illuminance on the photoconductive cell, and therefore inversely proportional to the scene brightness of the subject to result in proper exposure.) In general, the coefficient $\gamma$ of illuminance is smaller than 1 and this tendency is more pronounced with cells which are applicable particularly to a wider range of brightness of the subject. Furthermore, $\gamma$ is not constant over the variation range of intensity of light incident on the photoconductive cells for cameras of common type. In order to ensure proper exposure time control in an electronic shutter in which the shutter blades serve also as a diaphragm as in a so-called program shutter, the diameter of diaphragm aperture is changed at a constant speed so as to compensate for the errors attributable to the fact that $\gamma$ is not 1. Or there is another proposal in which a circuit comprising photoconductive cell and resistance is provided, for instance, as emitter resistance of the transistor shown in FIG. 1. It is also proposed to provide a circuit composed of capacitor and resistance in addition to the capacitor of the RC integrating circuit. These proposals so far made all aim to compensate for the nonlinearity of the above-described characteristics of the photoconductive cell, the problem which must be overcome in one way or another.

Since a device such as shown in FIG. 1 requires much space for the provision of many resistances, it is not suitable for a camera in which parts for various purposes are built in complicated arrangement. In addition, a number of lead wires respectively connecting the terminals $bt_1$, $bt_2$ ... $bt_n$ to the corresponding resistances $Rt_1$, $Rt_2$ ... $Rt_n$ are difficult to arrange in orderly manner, while connection and assemblage require much skill and a long period of time.

On the other hand, conventional electronic shutters have encountered a difficulty in providing indication of the value to which exposure time is to be controlled only by the transistor circuit. For this purpose, it has been suggested to dispose a galvanometer for the electronic shutter so as to couple the photocell of the shutter to the galvanometer for exposure time indication. Another proposal has also been made in which exposure time is indicated by the needle of a galvanometer whose angular position is determined in accordance with the intensity of light incident on the photocell, this system also serving to determine the resistance value of an RC integrating circuit. The present invention is an improvement over the latter.

SUMMARY OF THE INVENTION

An object of the present invention is to provide a device in which indicating means for exposure meter system is utilized for automatically selecting terminals of resistance means for exposure time control so as to ensure indication of exposure time and automatic control at the same time.

In the case where the terminals of the resistance means are used in common as those to be selected manually by a selector and as those to be selected automatically by indication means of the exposure meter, an additional complex mechanism provided therefor requires a considerable space, posing great restriction on the structure of the other mechanisms and resulting in difficulties and troubles for assemblage.

According to the present invention, therefore, the terminals for manual exposure setting and those for automatic exposure selection are provided in separate groups which are respectively connected to the resistance means. By assembling all of the resistance means, two separate groups of terminals and conductors interconnecting these elements into a single set, troubles which would otherwise be encountered due to the provision of a number of lead wires for connection can be eliminated. Indeed, the most distinguished advantage of the present invention is found in the fact that the resistance means, two terminal groups and conductors are built into a single set by which exposure time can be controlled automatically or manually along with indication of exposure time achieved at the same time. The compact electronic shutters with advantages above are easy to build without skill and fit for mass production.

The exposure meter systems in accordance with the present invention include, for instance, those comprising a combination of photoconductive cell and galvanometer and those in which indication of exposure time is achieved by a servomechanism provided with photoconductive cell.

DESCRIPTION OF THE PREFERRED EMBODIMENTS

Figure 1:
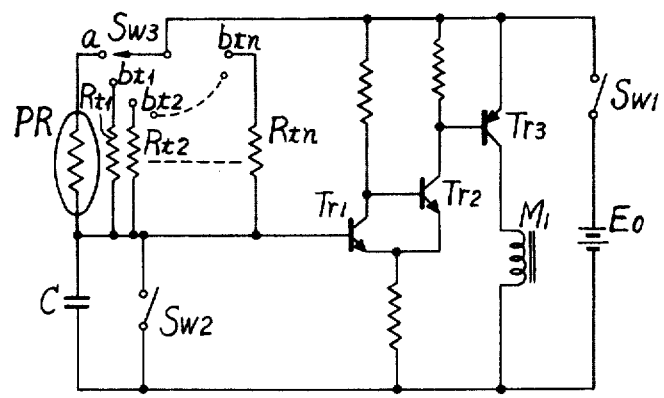
FIG. 1 is a circuit diagram showing a conventional embodiment of electric circuit for an electronic shutter.
Figure 2:
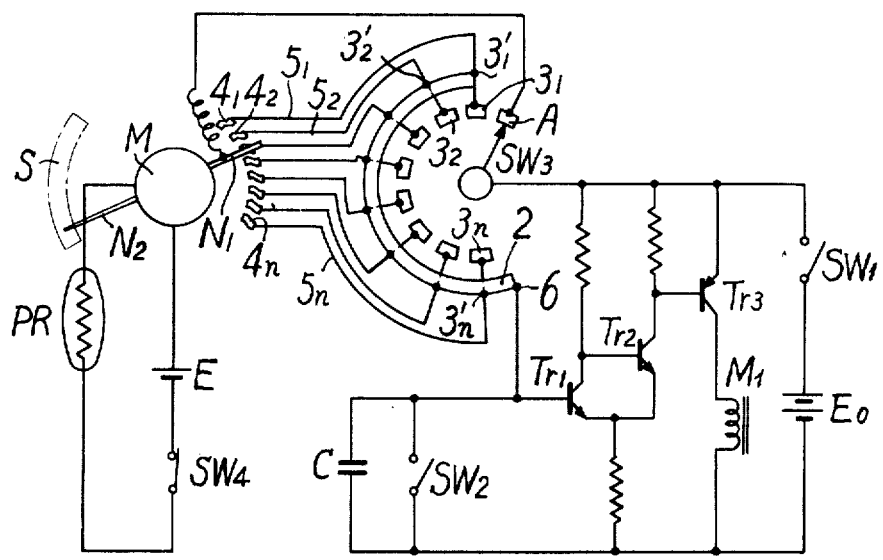
FIG. 2 is a circuit diagram of an embodiment of the electronic shutter system in accordance with the present invention which employs a set of resistance and terminals and in which the exposure meter system comprises a photoconductive cell, galvanometer and power source connected in series.

Referring to FIG. 2, designated at $Eo$ is a power source for the electronic shutter and at $SW_1$, a power source switch adapted to be closed upon shutter release and to be turned off in operative relationship with the closure of the shutter. Indicated at C is a capacitor which forms an RC integrating circuit along with resistance means 2 whose resistance value is selected by a meter terminal selection needle $N_1$ or by a switch $SW_3$ operatively related with a shutter speed setting member. A discharge switch $SW_2$ is adapted to be turned off in operative relationship with the opening of the shutter after the switch $SW_1$ has been closed.

In accordance with the present invention, the resistance means 2 and a group of terminals therefor to be selected manually and a terminal for effecting automatic exposure are assembled into the following structure. Disposed along the inner side of the circular arc resistance means 2 are a desired number of terminals $3_1, 3_2 \ldots 3_n$ to be selected manually and a terminal A for effecting automatic exposure. The terminals $3_1, 3_2 \ldots 3_n$ are each connected to the resistance means 2 by lead wires $3'_1, 3'_2 \ldots 3'_n$. The starting end 6 of the resistance means 2 is connected to the circuit of the capacitor C. On the other hand, provided for the needle $N_1$ of the meter M are terminals $4_1, 4_2 \ldots 4_n$ to be selected automatically by the needle $N_1$. These terminals are respectively connected to the terminals $3_1, 3_2 \ldots 3_n$ for manual selection by conductors $5_1, 5_2 \ldots 5_n$, while the terminal A for automatic exposure is electrically connected to the needle $N_1$. Designated at $Tr_1, Tr_2$ are transistors composing a switching circuit; at $Tr_3$, an output transistor; and at $M_1$, an electromagnet adapted to be energized by current which flows through the transistor $Tr_3$ when the switch $SW_1$ is closed upon shutter release. The electromagnet $M_1$, when energized, retains a member for preventing the shutter from closing. When the charge on capacitor C in the RC circuit reaches a predetermined level upon lapse of the time corresponding to the exposure time determined by the resistance previously selected by the needle $N_1$ or switch $SW_3$, the transistor $Tr_3$ is brought into a cutoff condition to discontinue the current flow through the electromagnet $M_1$ and release the shutter closure prevention member, whereupon the shutter is closed. In this system it is possible to use a single power source for the power source $Eo$ and power source E of the meter M.

FIG. 2 illustrates a case in which the switch $SW_3$ is set at the terminal A for automatic exposure so as to connect the terminal A to the meter needle $N_1$ electrically and operate the meter M with the resistance value of the photoconductive cell PR. Only when the switch $SW_3$ is set on the terminal A for effecting automatic exposure, the meter needle $N_1$ is clamped, during the initial period of shutter release (i.e. until the shutter is opened), to one of the terminals $4_1, 4_2 \ldots 4_n$ automatically selected in accordance with the deflected position of the needle, the clamping contact being effected by means of a needle clamping member (not shown). The circuit of the switch $SW_3$ is therefore closed. Upon completion of exposure, the needle clamping member is retracted to disengage the needle $N_1$ from the terminal and allow it to swing freely. In the case where the switch $SW_3$ is set on the terminal other than the terminal A, the needle clamping member, even if shutter release is effected, is not actuated to keep the needle $N_1$ out of contact with the terminals $4_1, 4_2 \ldots 4_n$. Needless to say, the sliding contact member of the switch $SW_3$ is operatively connected, directly or indirectly, to the shutter speed dial for automatic-manual exposure.

In setting the exposure time manually in the above-mentioned system, the shutter speed dial is set at a desired value, whereby the sliding contact member of the switch $SW_3$ is brought into contact with one of the terminals $3_1, 3_2 \ldots 3_n$ which corresponds to the shutter speed selected. The portion of the resistance means 2 between the starting point 6 and the terminal thus selected provides the resistance value required for the RC integrating circuit. When a shutter opening member is actuated and the switch $SW_2$ is opened upon the shutter release, exposure is effected based upon the resistance value of the resistance means 2, whereupon the shutter is closed as previously described.

In case the shutter speed dial is set for automatic operation, the sliding contact member of the switch $SW_3$ is brought into contact with the terminal A for automatic exposure. When the shutter is released in this condition, the needle $N_1$ is clamped against one of the terminals $4_1, 4_2 \ldots 4_n$ which is located at the position to which the needle $N_1$ is deflected. Accordingly, one of the terminals $3_1, 3_2 \ldots 3_n$ connected to the above-mentioned terminal in engagement with the deflected needle $N_1$ determines the resistance value of the resistance means 2 to be incorporated in the RC integrating circuit, which functions to control the exposure time automatically.

Figure 7:
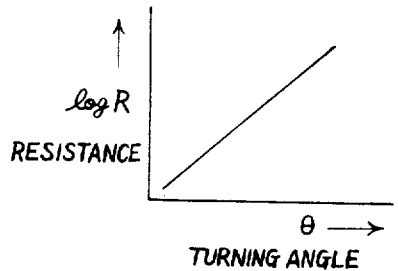
FIG. 7 is a graph showing the characteristics of resistance means of the present invention.
Figure 7:
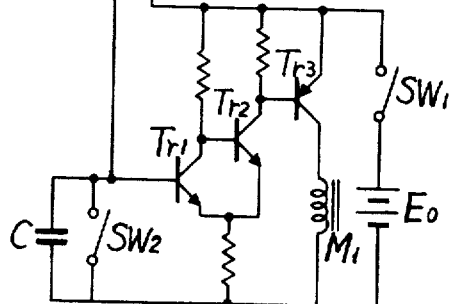

In accordance with the present invention, the exposure meter circuit for swinging the needle to an extent corresponding to scene brightness of the subject and the circuit for actuating the electronic shutter can be provided as separate circuits. The photoconductive cell whose resistance value varies in accordance with the scene brightness of the subject therefore serves only to deflect the meter needle by an amount corresponding to the scene brightness of the subject, with the result that the exposure time, regardless of whether it is manually or automatically selected, is determined by the resistance value which varies stepwise depending upon the length of the resistance means 2 to be incorporated in the RC circuit during operation. The relationship between the resistance value of the resistance means 2 and variation of the length from the starting point 6, namely, variation of the turning angle of the sliding contact member of the switch $SW_3$ is shown in FIG. 7 and represented by:

$$\log R \propto \theta$$
$$R \propto e^\theta$$

Thus, nonlinearity of illuminance-resistance characteristics inherent in the photoconductive cell which exerts adverse influence on the exposure time can be eliminated completely.

The structure described also has a useful advantage in that, without provision of an additional mechanism which has been required conventionally, the exposure time is indicated by the needle $N_2$ on the scale S all the time.

Figure 3:
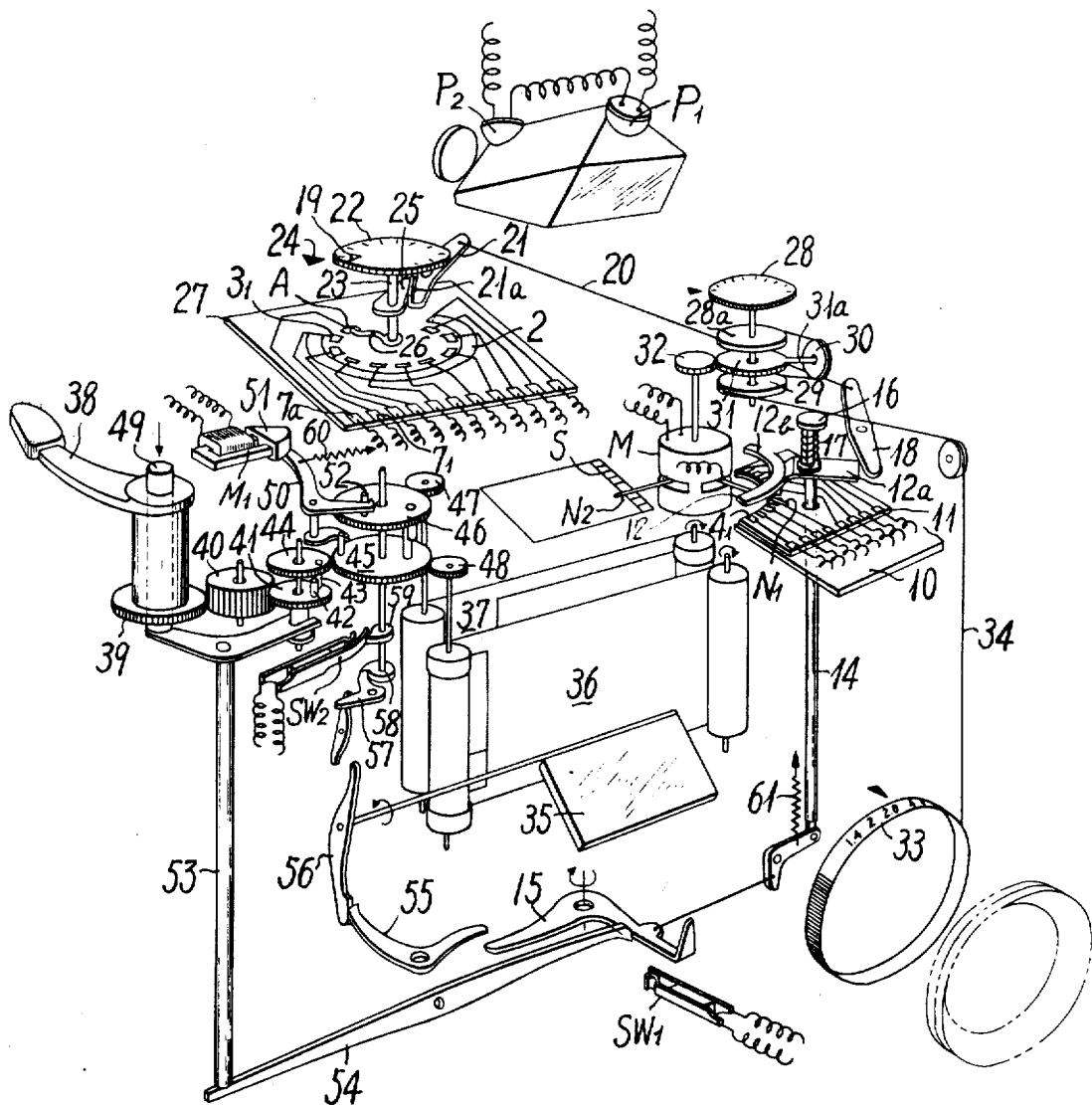
FIG. 3 is a perspective view of the principal parts embodying the operative relationships illustrated in FIG. 2.

FIG. 3 is a perspective view of the principal parts of a single-lens reflex camera of focal-plane type which employs the apparatus of the present invention. The parts in common with those in the embodiment of FIG. 2 are referred to by the same numerals and characters.

Photoconductive cells $P_1$ and $P_2$ are disposed on a pentaprism for the measurement of scene brightness of the subject whose image is to be focused on a focusing screen. For more accurate measurement of light, these two cells are electrically connected in series and the photoresistance thereof is indicated at PR in FIG. 2. Designated at M is a galvanometer; at $N_1$, a meter terminal selection needle; and at $N_2$, a needle for indicating the exposure time on a scale S. A base 11 made of an electrically insulating material and providing terminals $4_1, 4_2 \ldots 4_n$ to be selected automatically by the needle $N_1$ is adhered to a support plate 10.

Designated at 12 is a needle clamp. By providing a stepped portion close to the upper end of a needle clamp rod 14, the arched portion 12b is kept out of contact with the needle $N_1$ while it is not in operation. The needle clamp rod 14 is adapted to be moved up and down in operative relationship with a lever 15 to be actuated upon shutter release. The upper portion of the rod 14 extends through the support plate 10 and the needle clamp 12 with a stop member 16 fixed to the upper end of the rod. A spring 17 serves to clamp the needle clamp 12 to the stepped portion of the clamp rod 14. A lever 18 is urged in the clockwise direction all the time and connected, by a string 20, to a lever 21 for selecting automatic or manual operation. A shutter speed dial 22, fixed to a shaft 23, is provided with a scale on its upper face which indicates exposure times as well as automatic exposure state in cooperation with a mark 24. An automatic exposure setting lever 25, fixed to a shaft 23, is adpated to engage with an upstanding portion 21a of the selection lever 21 and turn the lever 21 in the counterclock direction when a mark 19 on the dial 22 for indicating automatic exposure is aligned with the mark 24. Due to this movement, the lever 18 is turned, through the string 20, in the counterclockwise direction against the tension acting thereon. Also secured to the shaft 23 is sliding contact member 26 which, due to its inherent elasticity, comes into pressing contact with a terminal A for effecting automatic exposure or one of the terminals $3_1, 3_2 \ldots 3_n$ corresponding to the respective exposure times, the switch $SW_3$ shown in FIG. 2 thus being constructed. A base 27, made of a thin Mylar film or the like, provides a group of the terminals $3_1, 3_2 \ldots 3_n$ including the terminal A for automatic exposure, another group of terminals $7_a, 7_1, 7_2 \ldots 7_n$ for lead wires, conductors for connecting each pair of the corresponding terminals in the respective groups and the resistance means 2. As already described, the resistance value of the resistance means 2 varies in accordance with the change in the turning angle of the contact member 26 in exponential functional relationship. The shaft 23 is further provided with click means known in the art so as to keep the shutter speed dial in the position for automatic exposure against the tension acting on the lever 18 when set to this position.

A dial 28 for setting the film speed is fixed to a shaft, to which a pulley 28a is secured. Disposed coaxially with the pulley are a pulley 29 and a gear 31, from which extends an arm 31a carrying a small pulley 30. Passing around the respective pulleys above is a string 34 or the like, one end of which is fixed to the pulley 28a with the other end secured to a diaphragm aperture setting ring 33. Depending upon the speed of the film to be used and the diaphragm aperture setting of an objective, the string 34 turns the galvanometer M to shift the position of its needle in accordance therewith.

Designated at 35 is a reflection mirror; at 36, an opening member of the focal-plane shutter; at 37, a closing member of the shutter; and at 38, a lever for shutter charge which, when turned counterclockwise, winds up the shutter opening member 36 and closing member 37 against the tension acting thereon respectively through gears 39, 40, 41, pins 42, 43 and gears 44, 45, 46, 47, the shutter thereby being brought into cocked position. Designated at 49 is a shutter release button, while indicated at $SW_1$, $SW_2$ are a power source switch and a capacitor discharge switch corresponding to $SW_1$ and $SW_2$ in FIG. 2. When energized, the electromagnet $M_1$ holds a lever 50 in engagement with a pin 52 on the gear 46 to prevent the closing member 37 from travel.

In the structure described above, when the shutter charge lever 38 is brought into set position after the film speed setting dial 28 has been set at the mark in accordance with the film speed, with the diaphragm aperture of the objective preset at the desired stop by the aperture setting ring 33, the galvanometer M is brought to an angular position in accordance with the setting of the ring 33 by the gear 32 in accordance with these values. The shutter speed dial 22 is then set at the position for automatic exposure, whereby the sliding contact member 26 is moved into contact with the terminal A and the automatic exposure setting lever 25 is engaged with the upstanding portion 21a of the selection lever 21 to turn the lever 21 in the counterclockwise direction. As a result, the lever 18 is turned counterclockwise against the tension acting thereon and released backward from the arm 12a of the needle clamp 12.

When the shutter release button 49 is depressed, with the parts set in the above positions, it will be seen from the drawing that the pin 42 is freed from the engagement with the pin 43 while a rod 53 turns the lever 54 in the counterclockwise direction to disengage the lever 54 from the lever 15, whereupon the lever 15 is urged in the clockwise direction to close the switch $SW_1$. That is, the power source switch in FIG. 2 is turned on and, due to the function of the transistor circuit in this drawing, the electromagnet $M_1$ is energized to attract an armature 51 and thereby hold the shutter closure prevention lever 50 in engagement with the pin 52. At the same time, the pivotal movement of the lever 15 causes the needle clamp rod 14 to move down thereby drawing the needle clamp 12 downward against the action of the spring 61, with the result that the terminal selection needle $N_1$ is held against one of the terminals $4_1, 4_2 \ldots 4_n$ which is located at the position corresponding to the turning angle of the needle. Accordingly, the resistance whose value is determined by the terminal in clamping engagement with the needle is connected in series with the capacitor C to provide the RC circuit.

Further due to the pivotal movement of lever 15, the diaphragm aperture of the objective is automatically set, by unillustrated means, at the position which is preset by the setting ring 33, while a lever 55 is disengaged from a lever 56 to allow the mirror 35 to swing upward due to the tension exerted thereon. Since the movement of the lever 56 frees the lever 57 from engagement with a stopper 58, the opening member 36 is urged to travel, so that the resultant counterclockwise rotation of an actuating member 59 provided coaxially with the gear 45 turns off the discharge switch $SW_2$ of the capacitor C when the opening member 36 is initiated into travel to charge the capacitor C. Upon lapse of the time determined by the resistance value selected by the needle $N_1$ and by the electrostatic capacity of the capacitor C, the capacitor C charged to the predetermined level actuates the transistor circuit to discontinue the current supply to the electromagnet $M_1$. The lever 50 is therefore urged clockwise by a spring 60 to release the pin 52, whereupon the closing member 37 is urged to travel to close the shutter. When the shutter is closed, the mirror is returned to the viewing position as illustrated, the lever 15 thereafter being restored to the original position. As a result, the power source switch is turned off while the needle clamp rod 14 is moved up to allow the clamp to be urged upward by the spring 61 and the needle $N_1$ is released.

On the other hand, in the case where the shutter speed dial is turned to align one of the manual exposure time settings with the mark 24, the sliding contact member 26 is brought into contact with one of the terminals $3_1, 3_2 \ldots 3_n$ corresponding to the exposure time selected. This forms an RC circuit provided with the capacitor C and the resistance value thus selected. In this case, the automatic exposure setting lever 25 is moved out of contact with the upstanding portion 21a of the selection lever 21 allowing the lever 18 to be urged clockwise out of the path of the stop member 16. Accordingly, even when the needle clamp rod 14 is moved vertically in operative relationship with the lever 15, the clamp 12 is left undisturbed to keep the needle $N_1$ out of clamping engagement therewith. When the shutter release button 49 is depressed in this state, the RC circuit with the capacitor and the resistance value which is manually selected functions to control the exposure time in the same manner as in the foregoing automatic control operation.

Figure 4:
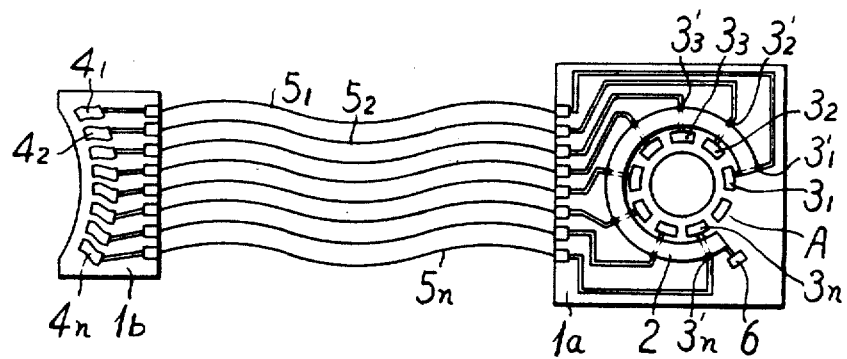
FIG. 4 is a plan view showing a set of a resistance and groups of terminals in accordance with the present invention.

FIG. 4 illustrates an embodiment, to be employed in the present invention, of a set comprising resistance means and a group of terminals for controlling exposure times. Designated at 1a and 1b are bases made of an electrically insulating material. The base 1a is provided with resistance means 2, a terminal A for effecting automatic exposure and terminals $3_1, 3_2 \ldots 3_n$ to be selected manually, the resistance means and terminals being arranged concentrically. Resistance values for time setting circuit are each provided between a terminal 6 at one end of the resistance means 2 and each of the lead wires $3'_1, 3'_2 \ldots 3'_n$ connected to the resistance means 2. As shown in FIG. 2, the terminal 6 at one end of the resistance means 2 is connected to the circuit of the capacitor C. Also as already described, terminals $4_1, 4_2 \ldots 4_n$ to be selected automatically by the meter needle cooperate with the needle of the meter M in FIG. 2. Designated at $5_1, 5_2 \ldots 5_n$ are conductors which connect the terminals $3_1, 3_2 \ldots 3_n$ to the corresponding terminals $4_1, 4_2 \ldots 4_n$ respectively. The terminal A for effecting automatic exposure is electrically connected to the needle of the meter M as already described with reference to FIG. 2.

In the case where the circuit for automatically controlling exposure is to be incorporated in a camera as already seen in the embodiment in FIG. 3, the above-described set of resistance means and groups of terminals ensures high amenability in that, due to the flexibility and insulating properties of a group of the conductors $5_1, 5_2 \ldots 5_n$, it can be built in the limited space of the camera in desired manner without resulting in interference with other mechanisms while assemblage can be carried out with high efficiency even by unskilled persons.

Figure 5:
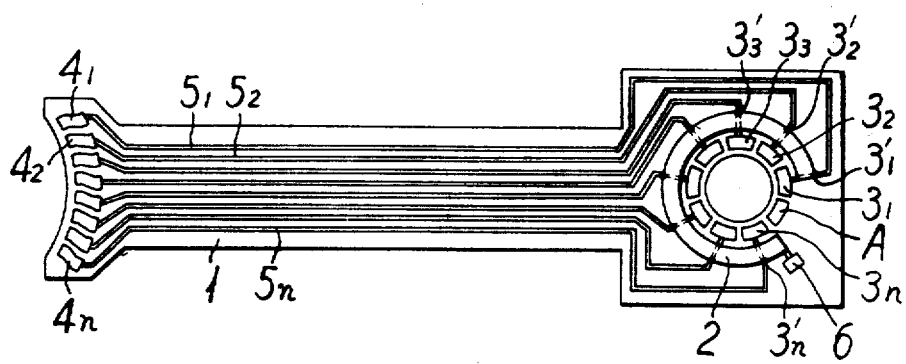
FIG. 5 is a plan view showing a modified embodiment of FIG. 4.

FIG. 5 illustrates a modified embodiment of the present invention. In accordance with this embodiment, resistance means, a group of terminals $3_1, 3_2 \ldots 3_n$ to be manually selected for exposure control arranged along the resistance means, lead wires $3'_1, 3'_2 \ldots 3'_n$ connected to the terminals, another group of terminals $4_1, 4_2 \ldots 4_n$ are all provided on a single thin flexible insulating base 1 made of Mylar, epoxy resin or the like. The electrical conductors $5_1, 5_2 \ldots 5_n$ for connecting the lead wires $3'_1, 3'_2 \ldots 3'_n$ to the terminals $4_1, 4_2 \ldots 4_n$ are printed on the base 1. Being flexible, the base 1 can be bent and disposed in a desired portion in the camera body. The base 1 as seen in a plan view may be made in desired shape for the convenience of assemblage and for stable provision.

Figure 6:
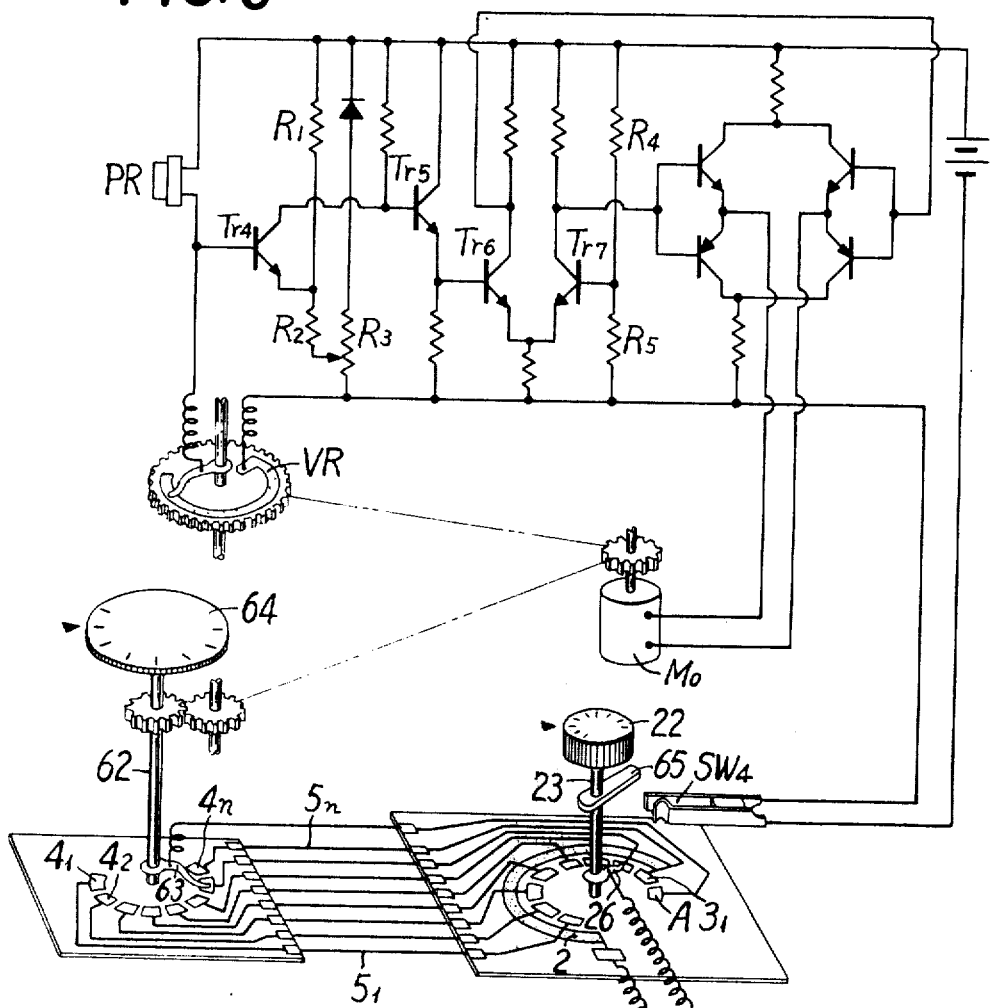
FIG. 6 is an electric circuit of another embodiment of a shutter system in accordance with the present invention in which the exposure meter system comprises a servomechanism including a photoconductive cell.

FIG. 6 shows a modified embodiment of the present invention in which the exposure meter system comprises a servomechanism. A bridge circuit is composed of a photoconductive cell PR, variable resistor VR, resistor $R_1$ and resistances $R_2, R_3$. The output of the bridge circuit is amplified by transistors $Tr_4$, $Tr_5$ and in a differential amplification circuit comprising transistors $Tr_6$ and $Tr_7$ the amplified voltage is further compared with the voltage predetermined by the resistances $R_4$, $R_5$ and the difference is amplified. The output of the differential amplification circuit, supplied through the circuit comprising four transistors drives a servomotor Mo in the clockwise or counterclockwise direction. The motor Mo is operatively connected to the variable resistor VR by a gear system or the like, so that as the motor Mo is driven, the value of the variable resistor VR is changed until the ratio of photoresistance of the photoconductive cell PR to the resistance value of the variable resistor VR reaches a predetermined value, when the motor Mo is halted.

Further by means of a gear system or the like, the rotation of the motor Mo is also delivered to the shaft 62 to which are fixed a sliding contact member 63 for automatically selecting one of the terminals $4_1, 4_2 \ldots 4_n$ and a disc 64 for indicating exposure times. In accordance with the rotation of the motor Mo, a predetermined terminal is selected and the exposure time controlled through the sliding contact member 63 is indicated on the disc 64. The sliding contact member 26 fixed to the shaft 23 of the shutter speed dial 22 is electrically connected to the sliding contact member 63.

The switch actuating member 65 fixed to the shaft 23 serves to turn on the switch $SW_4$ to thereby actuate the circuit of the servomotor when the shutter speed dial 22 is set for automatic exposure. By means of the RC circuit comprising the capacitor C and the resistance whose value is determined by the terminal selected manually with the shutter speed dial or automatically by the servomechanism, the exposure time is controlled in the same manner as in FIG. 2.

The present invention is not limited to the foregoing embodiments but various other modifications embodying the spirit of this invention may also be included therein.

We claim:

1. A network in an automatic exposure time controlling device for a camera comprising an automatic terminal and a group of terminals for manual exposure setting to be selected by a manual selector, said terminals of said group of terminals being connected respectively to a resistance means by lead wires which are spaced along the length thereof and through which resistance values corresponding to respective exposure times are obtained stepwise; another group of terminals to be selected automatically at the position which corresponds to the intensity of incident light from the subject and including an electrically conductive member connected to said automatic terminal and occupying a position responsive to said incident light intensity for engagement with a corresponding terminal of said other group; and shutter actuating means for closing a shutter to be controlled by an electromagnet which is operated by an RC integrating circuit actuated with the resistance value of said resistance means determined alternatively by one of said two groups of terminals, wherein a first insulating base carries said resistance means and a first of said group of terminals; a second insulating base carries a second of said groups of terminals; mutually insulated conductors connect said first group of terminals to respective spaced points along said resistance means; and conductor means connect said first group of terminals to corresponding terminals of said second group respectively.

2. The network as set forth in claim 1, wherein said resistance means is of arcuate form and said first group of terminals $(3_1-3_n)$ are disposed along the inner side of said resistance means.

3. The network as set forth in claim 1, wherein a terminal for automatic exposure time control is disposed concentric with and apart from said first group of terminals.

4. The automatic exposure time controlling device for a camera as set forth in claim 1, wherein a terminal for connecting said resistance means to a circuit capacitor is disposed at one end of said resistance means and including a light meter having an electrically conducting needle defining said conductive member and means for selectively urging and clamping said needle into engagement with a registering terminal of said automatically selected group.

5. The network as set forth in claim 1, wherein said second group of terminals are disposed along an arcuate path.

6. The network as set forth in claim 1, including a thin flexible insulator band extending between said base sections and supporting said conductor means extending between said resistance means and said second group of terminals on said second base section.

7. The network as set forth in claim 1, wherein said base sections are made of a thin insulating synethetic resin material.

* * * * *